US009203225B2

United States Patent
Akuta

(10) Patent No.: US 9,203,225 B2
(45) Date of Patent: Dec. 1, 2015

(54) WIRE FIXING MEMBER

(71) Applicant: Sumitomo Wiring Systems, Ltd., Yokkaichi, Mie (JP)

(72) Inventor: Daisuke Akuta, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 253 days.

(21) Appl. No.: 13/656,810

(22) Filed: Oct. 22, 2012

(65) Prior Publication Data

US 2013/0140075 A1    Jun. 6, 2013

(30) Foreign Application Priority Data

Dec. 5, 2011    (JP) .................................. 2011-265544

(51) Int. Cl.
 *H02G 3/08* (2006.01)
 *H05K 9/00* (2006.01)
 *H02G 3/32* (2006.01)

(52) U.S. Cl.
 CPC ........................ *H02G 3/32* (2013.01)

(58) Field of Classification Search
 CPC ........................................... H02G 3/32
 USPC ........................................... 174/650
 See application file for complete search history.

(56) References Cited

U.S. PATENT DOCUMENTS

| | | | |
|---|---|---|---|
| 4,438,294 A * | 3/1984 | Meltsch et al. ............. | 174/88 R |
| 5,545,854 A * | 8/1996 | Ishida ....................... | 174/153 G |
| 6,660,937 B1 | 12/2003 | MacLeod et al. | |
| 6,814,617 B2 | 11/2004 | Oota et al. | |
| 7,275,960 B2 * | 10/2007 | Fukushima et al. ..... | 439/607.15 |
| 8,460,015 B2 * | 6/2013 | Deno et al. ................ | 439/98 |
| 2008/0138018 A1 | 6/2008 | Momotsu et al. | |
| 2011/0195596 A1 | 8/2011 | Sakakura et al. | |
| 2012/0058674 A1 | 3/2012 | Deno et al. | |

* cited by examiner

*Primary Examiner* — Tremesha S Willis
*Assistant Examiner* — Michael E Moats, Jr.
(74) *Attorney, Agent, or Firm* — Gerald E. Hespos; Michael J. Porco; Matthew T. Hespos

(57) ABSTRACT

A wire fixing member (10) to be fixed to an unillustrated case housing a device by fixing a shield shell (40) to the case includes a housing (20) to be held in the shield shell (40), wires (W) pulled out through the housing (20), a housing projection (28) located at a part of the housing (20) where the wires W are pulled out and formed to project along the wires (W), and an adhesive tape (T) for integrally fixing the wires (W) and the housing projection (28) by covering both the wires (W) and the housing projection (28) and adhering to the wires (W) and the housing projection (28).

10 Claims, 8 Drawing Sheets

WIRE FIXING MEMBER

BACKGROUND OF THE INVENTION

1. Field of the Invention

The invention relates to a wire fixing member with a shield shell.

2. Description of the Related Art

U.S. Pat. No. 6,814,617 discloses a wire fixing member with a metal crimp ring, a wire holder, and a shield shell. The wire fixing member is fixed to a case of a device while fixing wires and the metal crimp fitting is crimped and connected to the wires. The wire holder has two half members that sandwich the crimp fitting from upper and lower sides and the shield shell is fixed to the case while accommodating the wire holder inside.

The crimp fitting initially is crimped and connected to insulation coatings of the wires and then is sandwiched from upper and lower sides by the wire holder for fixing the wire holder to the wires. The wire holder then is accommodated in the shield shell so that the wire holder does not come out, thereby fixing the wires to the wire fixing member. However, the crimp fitting may bite into the insulation coatings sufficiently to break the insulation coatings. As a result, cores and the like inside the wires may be damaged if the wires are pulled strongly or swung a large amount.

The invention was completed in view of the above situation and an object thereof is to fix a wire without damaging an insulation coating thereof.

SUMMARY OF THE INVENTION

The invention relates to a wire fixing member to be fixed to a case housing of a device by fixing a shield shell to the case. The wiring fixing member includes a housing to be held at least partly in the shield shell and at least one wire is pulled out through the housing. At least one housing projection is located at a part of the housing where the wire is pulled out and is formed to project substantially along the wire. A cover covers both the wire and the housing projection and adheres to the wire and the housing projecting portion for integrally fixing the wire and the housing projection.

The wire may be pulled strongly or swung a large amount. However, the cover follows the wire. As a result, the wire and the housing projection can be maintained in an integrally fixed state that can be maintained without damaging an insulation coating of the wire.

The housing projection may have at least one guide groove dimensioned to receive at least part of the wire. Thus, the wire easily can be arranged along the housing projection by fitting the wire at least partly into the guide groove, thereby improving operational efficiency when using the cover to fix the wire to the housing projection.

At least one flange may be formed at or near a leading end part of the housing projection in a projecting direction and bites or engages into the cover, thereby enhancing a fixing force of the cover to the housing projection.

The cover may be or comprise an adhesive tape that sticks to the wire and the housing projection. Accordingly, the wire and the housing projection integrally can be fixed more reliably as compared with a heat shrinking tube or the like.

A dimension of the housing projecting portion in a projecting direction may be slightly larger than the outer diameter of the wire.

A width of the cover may be slightly larger than a projecting distance of the housing projection.

The cover may be wound around the housing projection and the wire in the width direction intersecting an extending direction of the wire and/or may substantially cover from a base end of the housing projection to a position somewhat before the leading end of the housing projection.

The shield shell may comprise at least one shield-connecting portion through which the wire can be passed, and the shield-connecting portion may be connected to the wire by a shield conductor and a connection member.

The housing may comprise a resilient plug accommodating portion for at least partly accommodating a resilient plug fit to the wire inside to provide fluidproofness.

These and other objects, features and advantages of the invention will become more apparent upon reading of the following detailed description of preferred embodiments and accompanying drawings.

DETAILED DESCRIPTION OF THE PREFERRED EMBODIMENT

A wiring fixing member in accordance with an embodiment of the invention is identified by the numeral 10 in FIGS. 1 to 8. The wire fixing member 10 includes a housing 20 through which wires W are passed in substantially forward and backward directions FBD. The wire fixing member 10 also includes a shield shell 40 made of conductive material (such as metal) and mounted on a rear part of the housing 20. A front part of the housing 20 of the wire fixing member 10 can be fit into an unillustrated mounting hole provided in a conductive metal case. The shield shell 40 and the case are shield-connected by fixing the shield shell 40 to the case by at least one bolt (not shown).

The wire W has an unillustrated core is covered by an insulation coating W1, and an unillustrated terminal fitting is crimped and connected to the core exposed by stripping the insulation coating W1 at an end of the wire W. The end of the wire W to which the terminal fitting is connected is to be pulled into the case through the mounting hole and connected to an unillustrated device housed in the case by bolting the terminal fitting to an unillustrated terminal block provided in the case.

Figure 6:
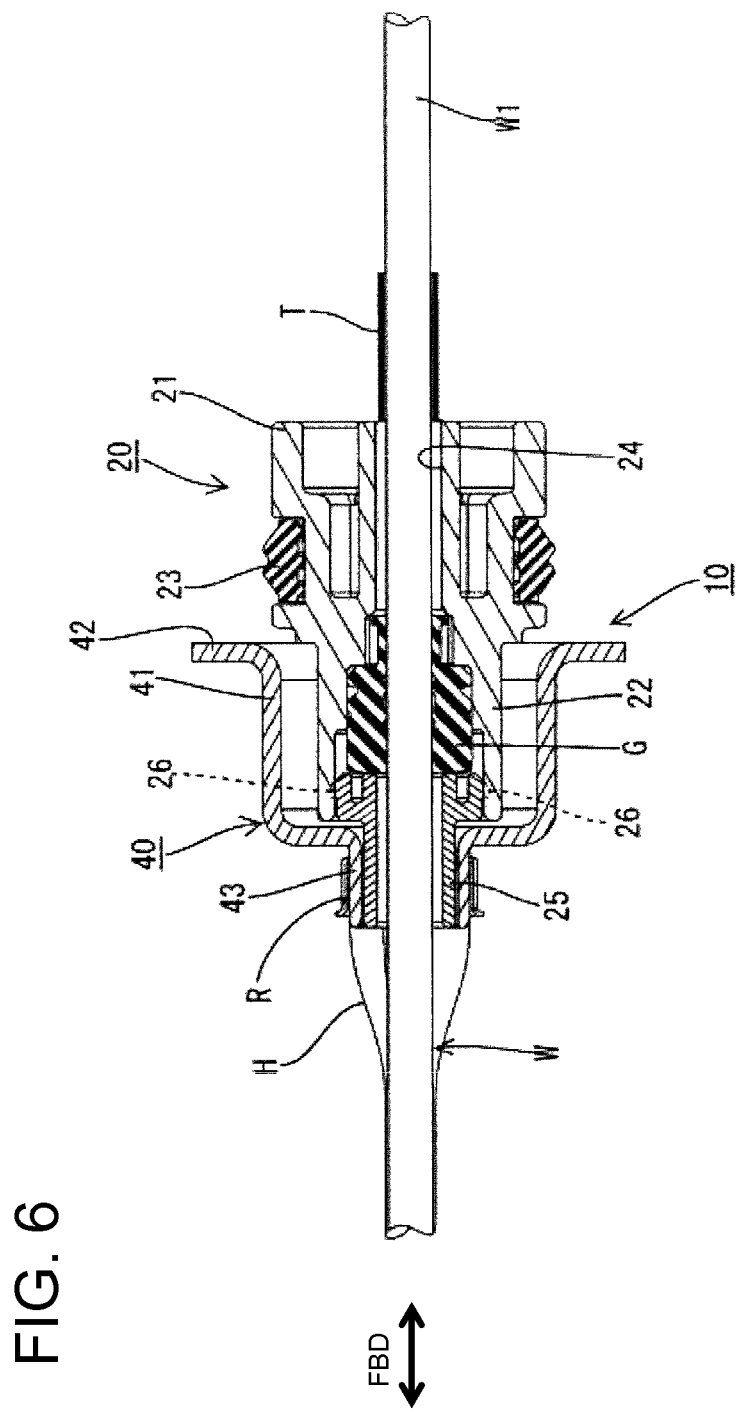
FIG. 6 is a section along B-B of FIG. 3.
Figure 7:
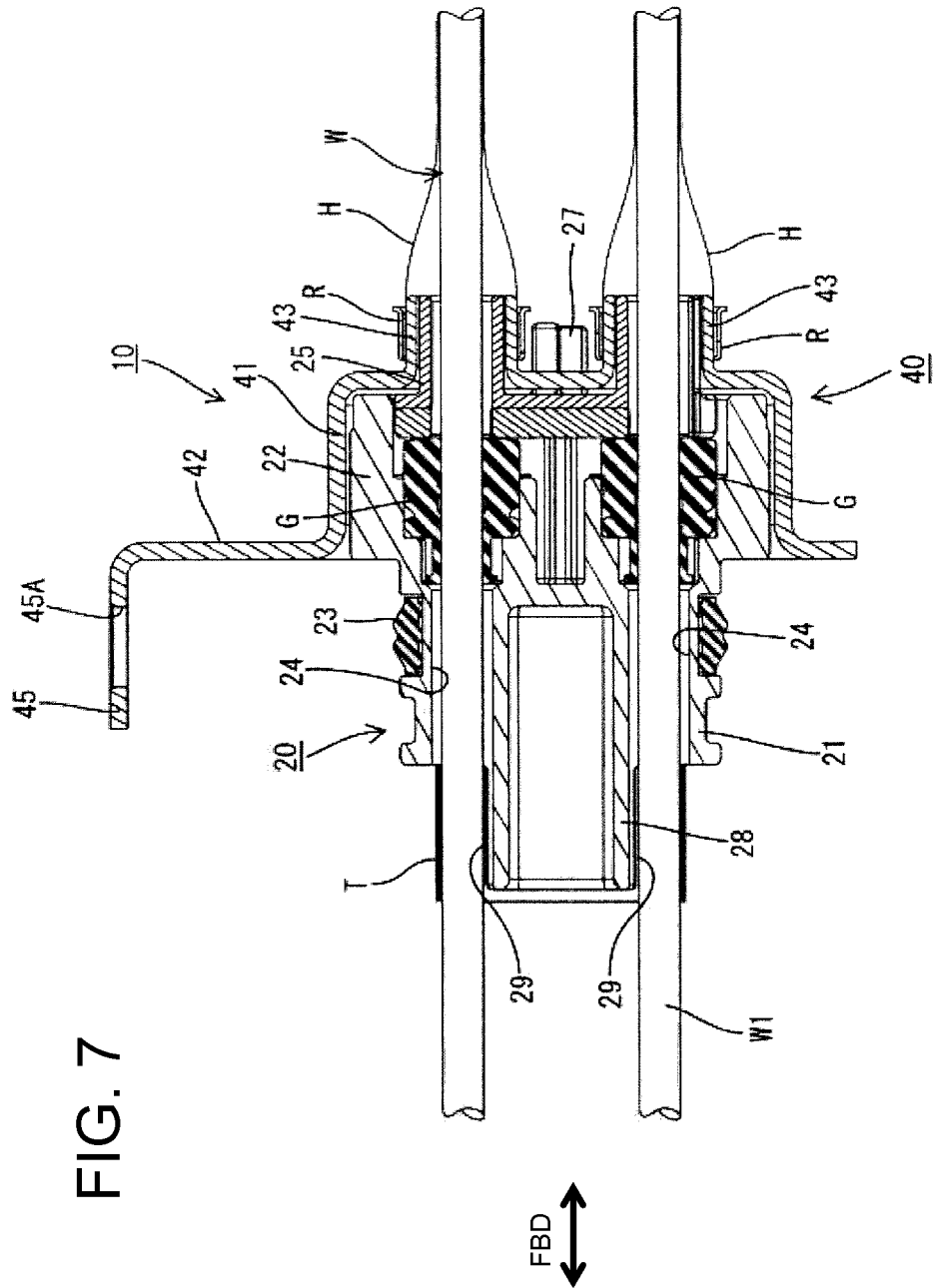
FIG. 7 is a section along C-C of FIG. 3.

The housing 20 is made e.g. of synthetic resin and the wires W are to be passed through the housing 20 substantially in forward and backward directions FBD as shown in FIGS. 6 and 7. Further, a fitting 21 is defined at a front part of the housing 20 and can fit into the mounting hole. A plug accommodating portion 22 is defined at a rear part of the housing 20 for accommodating one or more resilient plugs or rubber plugs G inside.

Figure 1:
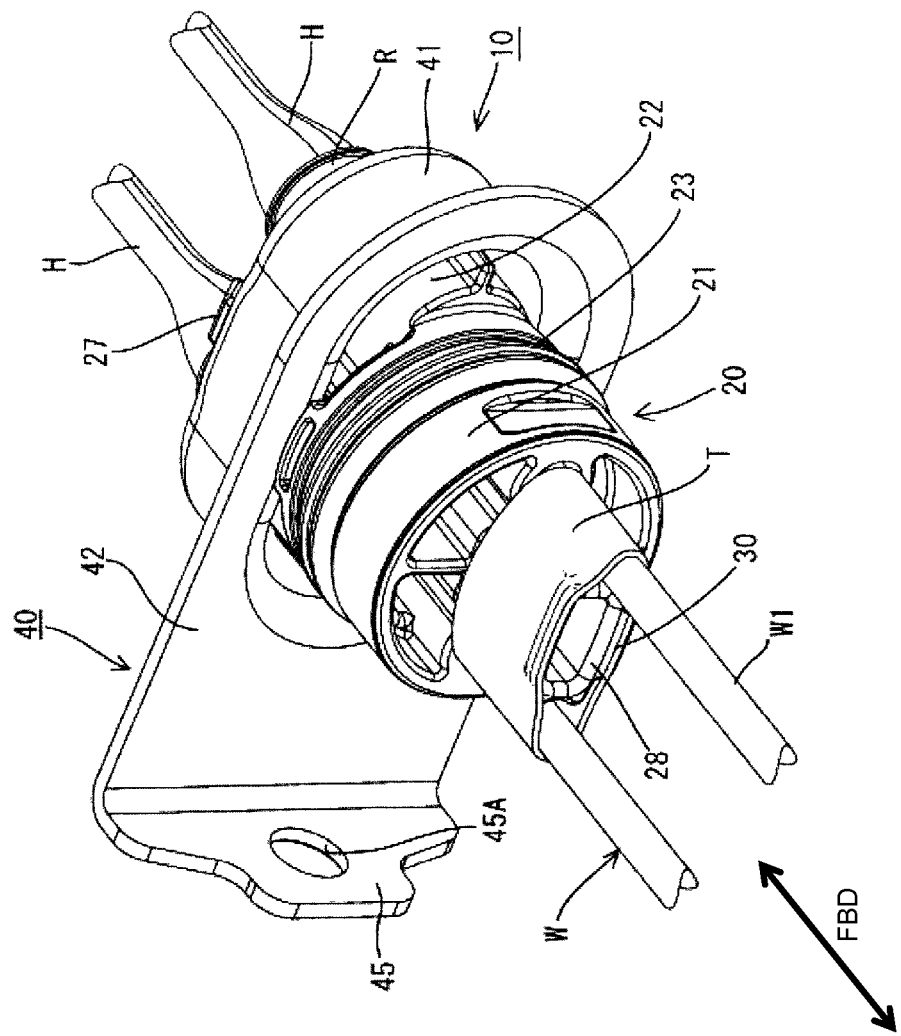
FIG. 1 is a perspective view showing wires fixed to a wire fixing member.

As shown in FIG. 1, the fitting 21 is substantially tubular and at least one seal ring 23 is to be mounted on the outer peripheral surface of the fitting 21. The seal ring 23 closely contacts the outer peripheral surface of the fitting 21 and the inner peripheral surface of the mounting hole to seal between the fitting 21 and the mounting hole when the fitting 21 is fit into the mounting hole.

As shown in FIG. 7, two wire insertion holes 24 are formed substantially side by side in a width direction in the fitting 21 and the respective wires W can be inserted therethrough in forward and backward directions FBD. Inner diameters of the wire insertion holes 24 are slightly larger than outer diameters of the wires W.

Only the wires W are accommodated in the fitting 21. Thus, an outer dimension of the fitting 21 can be made smaller in the width direction of the fitting 21 as compared with a fitting for accommodating terminal fittings having a larger dimension in the width direction than the wires W.

The substantially ring-shaped resilient plugs G externally mounted on the wires W can be accommodated in the plug accommodating portion 22. The resilient plug G accommodated into the plug accommodating portion 22 closely contacts the outer peripheral surface of the wire W and the inner peripheral surface of the plug accommodating portion 22 to seal between the wire W and the plug accommodating portion 22.

As shown in FIG. 6, a plug presser 25 is assembled to into a rear end part of the plug accommodating portion 22 of the housing 20 and engages the rear end surfaces of the resilient plugs G from behind for locking. A front end part of the plug presser 25 is fit into the plug accommodating portion 22, and the plug presser 25 is assembled into the plug accommodating portion 22 by engaging at least one locking projection 26 formed on a front part of the plug presser 25 with the inner wall of the plug accommodating portion 22. In this way, the resilient plugs G are held not to come out of the plug accommodating portion 22.

The shield shell 40 is formed such as by press-working and drawing an electrically conductive metal plate material. Further, as shown in FIGS. 1 and 2, the shield shell 40 includes a shell main portion 41 for accommodating the plug accommodating portion 22 inside and a bulge 42 that bulges out from the shell main portion 41.

As shown in FIGS. 1 and 7, the shell main portion 41 is a forwardly open receptacle and the resilient plug accommodating portion 22 is accommodated therein from the front. Two shield-connecting portions 43 are formed substantially side by side in a back wall 41A of the shell main portion 41. The shield-connecting portion 43 is a substantially cylindrical hole penetrating in forward and backward directions FBD and is formed so that the wire W pulled out backward from the resilient plug accommodating portion 22 of the housing 20 can be passed therethrough. A braided wire H or other shield conductor is mounted on the outer peripheral surface of the shield-connecting portion 43 and a crimp ring R is crimped to hold the braided wire H on the shield-connecting portion 43 so that the wire W pulled out backward from the shield-connecting portion 43 is shielded by the braided wire H. It should be understood that a shield conductor different from the braided wire H may be used, such as a conductive sheet or layer, a conductive film or the like.

Figure 5:
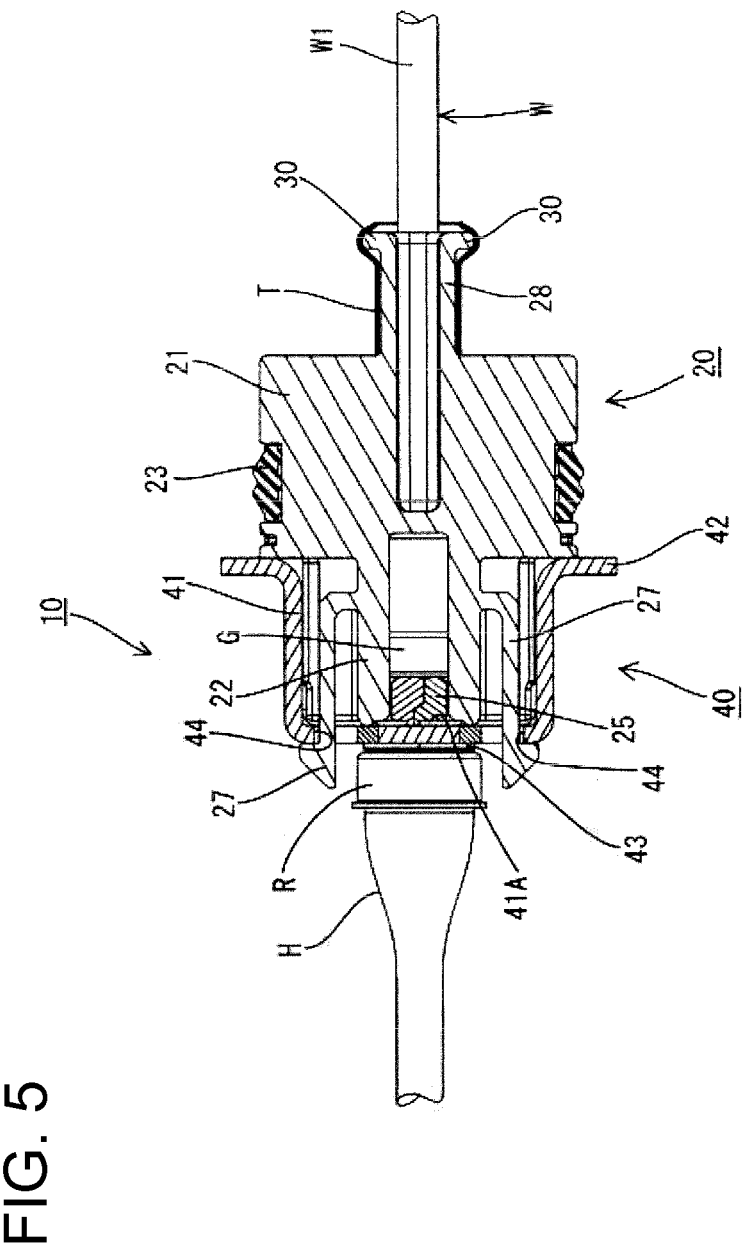
FIG. 5 is a section along A-A of FIG. 3.

Upper and lower locking holes 44 are formed in the back wall 41A of the shell main portion 41, as shown in FIG. 5. On the other hand, resilient locking pieces 27 are cantilevered back from upper and lower surfaces of the resilient plug accommodating portion 22 and can deform resiliently in directions intersecting the forward and backward directions FBD. The resilient locking pieces 27 are insertable into the respective locking holes 44 and leading ends of the resilient locking pieces 27 engage peripheral edges of the locking holes 44 from behind when the resilient plug accommodating portion 22 is accommodated into the shell main portion 41 to fix the housing 20 to the shield shell 40.

Figure 2:
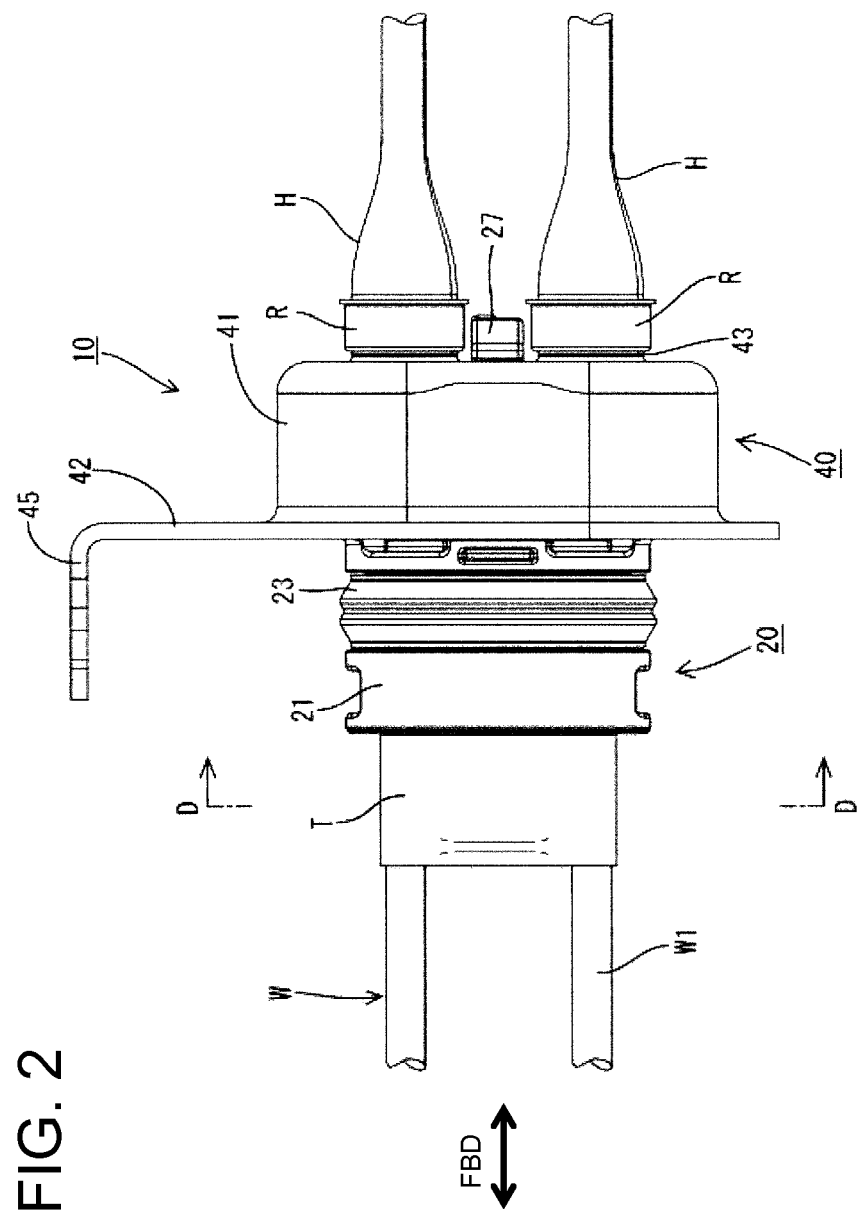
FIG. 2 is a plan view showing the state of FIG. 1.

As shown in FIGS. 1 and 2, the bulge 42 is provided circumferentially on a front end opening edge of the shell main portion 41 and bulges out substantially perpendicular to an axial direction of the shell main portion 41 and to the forward and backward directions FBD to extend along the outer surface of the case. The bulge 42 comes into surface contact with the outer surface of the case when the fitting 21 of the housing 20 is fit into the mounting hole.

A mounting piece 45 extends substantially perpendicularly forward from one lateral edge of the bulge 42. A bolt insertion hole 45A penetrates the mounting piece 45 in a plate thickness direction and an unillustrated bolt is inserted into the bolt insertion hole 45A and screwed into the case to fix and shield-connect the shield shell 40 to the case.

Figure 3:
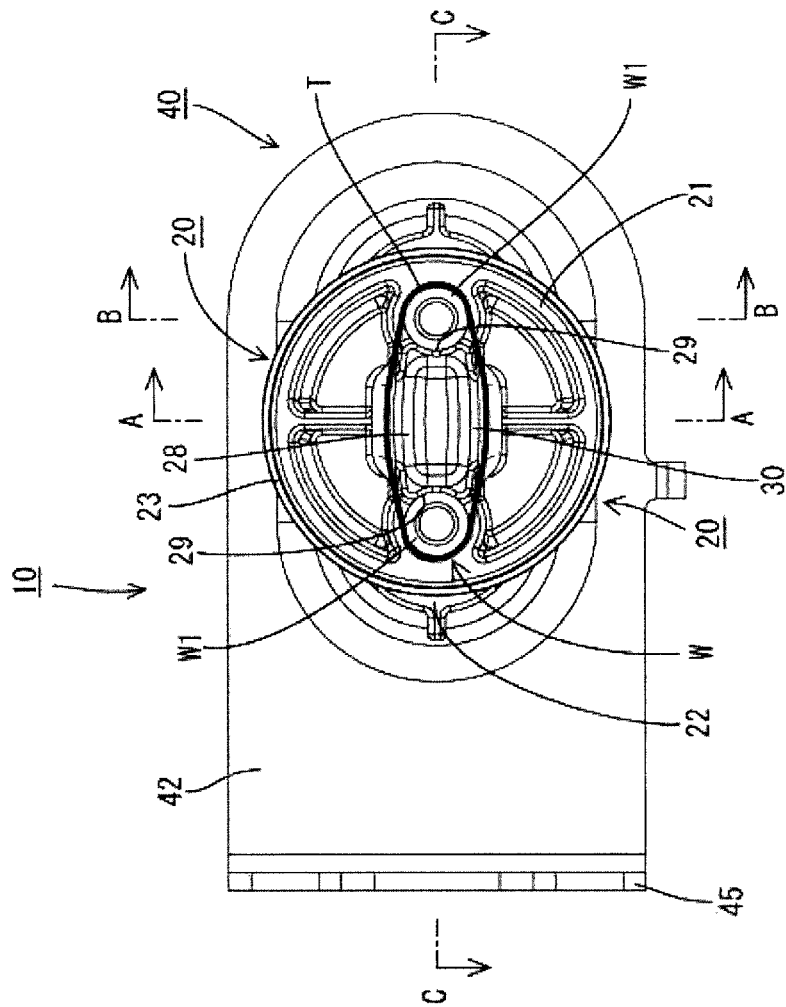
FIG. 3 is a front view showing the state of FIG. 1.
Figure 8:
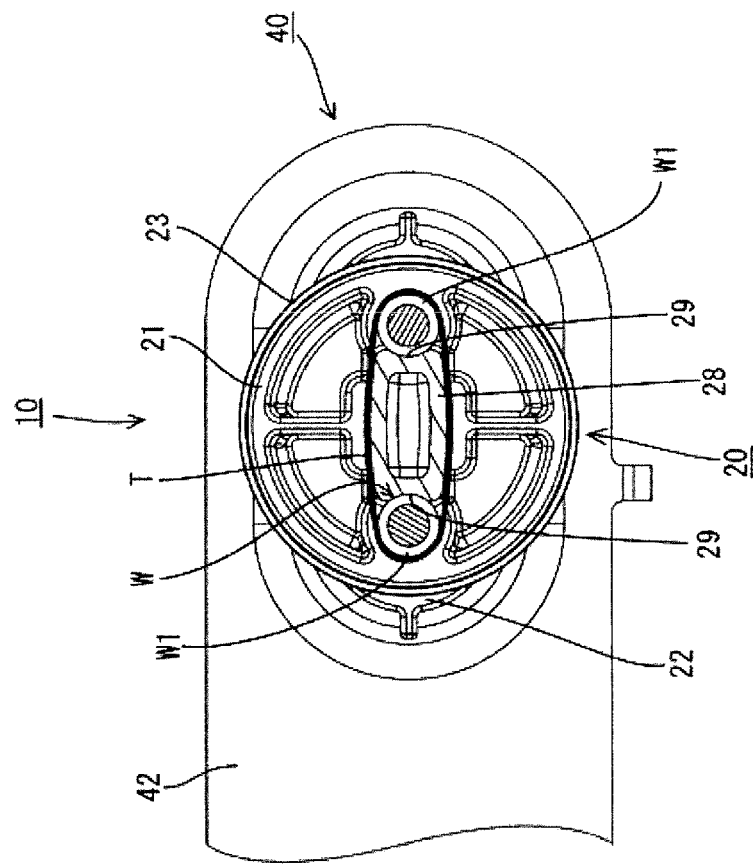
FIG. 8 is a section along D-D of FIG. 2.

As shown in FIGS. 1 to 4, a housing projection 28 projects forward from the front surface of the fitting 21, and this and the wires W pulled out forward from the fitting 21 are secured to the housing projection 28 by adhesive tape T. Specifically, as shown in FIG. 7, the housing projection 28 is arranged between the two wires W pulled out forward from the front end surface of the fitting 21 and extends substantially straight along the wires W. As shown in FIGS. 3 and 8, two guide grooves 29 are formed on opposite widthwise end parts of the housing projection 28 and the respective wires W are fit therein. The guide grooves 29 have a concave cross-sections recessed inward in the width direction, and extend from the front end surface of the fitting 21 to the front end of the housing projection 28. The wires W are fit respectively fit into the guide grooves 29 in the width direction to arrange the wires W along the housing projection 28

A dimension of the housing projection 28 in the vertical direction is slightly larger than the outer diameter of the wires W. An outer peripheral shape formed by the upper and lower surfaces of the housing projection 28 and the outer peripheral surfaces of the wires W located on the widthwise outer sides defines a wide substantially elliptical shape.

Two vertically bulging flanges 30 are formed on a front end part of the housing projection 28, as shown in FIG. 5.

Figure 4:
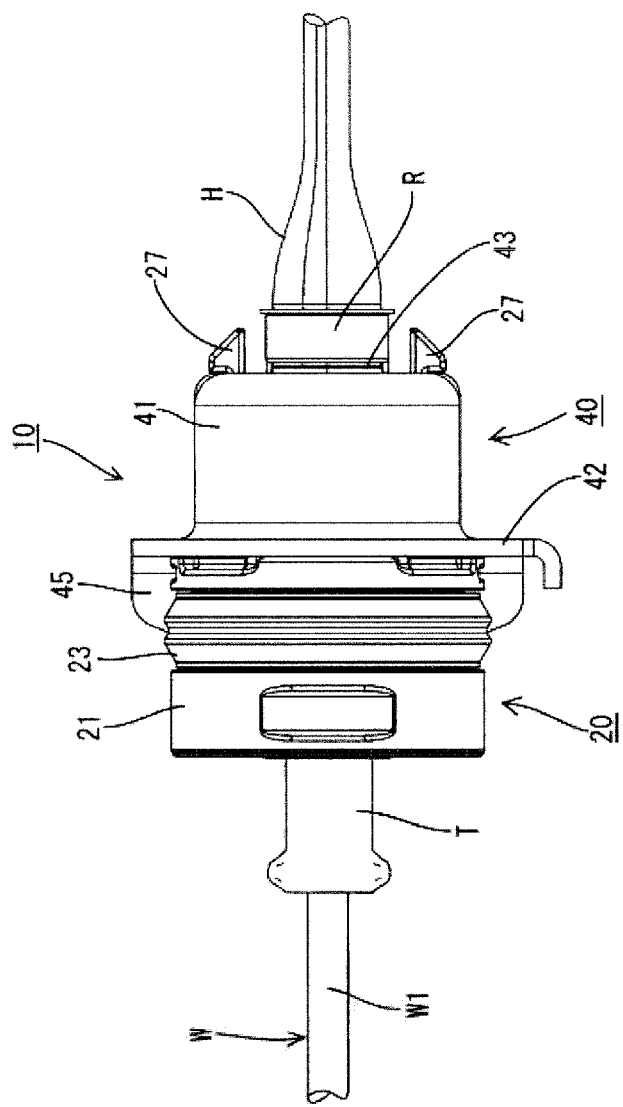
FIG. 4 is a side view showing the state of FIG. 1.

The adhesive tape T is made of resin and has a width slightly larger than a projecting distance of the housing projection 28, as shown in FIG. 7. Further, as shown in FIGS. 2, 4 and 5, the adhesive tape T is wound around the housing projection 28 and the wires W in the width direction with the wires W fit in the guide grooves 29 of the housing projection 28, and covers from the base end of the housing projection 28 to a position somewhat before the leading end of the housing projection 28. Specifically, as shown in FIGS. 3 and 8, the wound adhesive tape T has a substantially elliptical cross-sectional shape and reliably and closely sticks to the upper and lower surfaces of the housing projection 28 and the outer peripheral surfaces of the widthwise outer sides of the both wires W. In this way, the wires W and the housing projection 28 are fixed integrally.

The wire W may be pulled forward or backward or swung in the width direction while the wires W and the housing projection 28 are fixed. However, the adhesive tape T that integrally fixes the wires W and the housing projection 28 follows the wire W and keeps the wires W fixed to the housing projection 28. In this way, a state where the wires W are fixed to the housing 20 can be maintained while avoiding breakage of the insulation coatings W1 of the wires W.

The adhesive tape T sticks to the wires W and the housing projection 28 so that the wires W and the housing projection 28 integrally are fixed more reliably. Thus, displacements of the wires W from the housing projection 28 in forward and backward directions FBD are suppressed more effectively than if the wire W and the housing projection are fixed by a heat shrinking tube or the like.

The flanges 30 of the housing projection 28 laterally or vertically bite into the adhesive tape T when the housing projection 28 and the wires W are tied together by the adhesive tape T so that a front end part of the adhesive tape T bulges laterally or vertically to enhance a fixing force of the adhesive tape T to the housing projecting portion 28. Thus, forward or backward displacement of the adhesive tape T from the housing projection 28 is suppressed even if the wire W is pulled strongly forward or backward, thereby suppressing forward and backward displacements of the wires W from the housing 20.

The wires W having the resilient plug G externally mounted thereon and the housing 20 are prepared. The wires W then are inserted into the plug accommodating portion 22 and pulled out forward from the wire insertion holes 24 of the fitting 21.

Then, the resilient plugs G are inserted into the plug accommodating portion 22 and the resilient plug presser 25 is assembled into the plug accommodating portion 22 behind to the resilient plugs G. In this way, sealing is provided between the outer peripheral surfaces of the wires W and the inner peripheral surface of the resilient plug accommodating portion 22 by the resilient plugs G and the resilient plugs G are retained by the resilient plug presser 25. Further, the terminal fittings are crimped and connected to ends of the wires W pulled out forward a specified distance from the fitting 21.

Subsequently, the wires W pulled out from the front surface of the fitting 21 are fit into the respective guide grooves 29 and are arranged substantially along the opposite end parts of the housing projection 28. The adhesive tape T then is wound around the housing projection 28 and the wires W several times. At this time, the wires W are guided by the respective guide grooves 29, the wire(s) W can easily can be extended along the opposite end parts of the housing projection 28 as compared with the case where they are not guided. In this way, operability in integrally fixing the housing projection 28 and the wires W by the adhesive tape T can be improved.

The adhesive tape T adheres to the upper and lower surfaces of the housing projection 28 and the outer peripheral surfaces of the widthwise outer sides of the wires W and covers the housing projection 28 and the wires W for integrally fixing the housing projection 28 and the wires W. Further, the front end part of the adhesive tape T, the flanges 30 of the housing projection 28 bites and engages into the front part of the adhesive tape T to enhance a fixing force of the adhesive tape T to the housing projection 28. In this way, the wires W are fixed reliably to the housing 20.

The wires W are pulled out from both front and rear sides in the wire fixing member 10 through which the wires W are passed in forward and backward directions FBD. Thus, the wires W may be pulled strongly in forward and backward directions FBD and swung large amounts in the width direction in fixing the wire fixing member 10 to the case or fixing the terminal fittings to the terminal block. In such a case, a stress concentrates on a part where the wires W are fixed. However, the wires W are fixed to the housing projection 28 by the adhesive tape T made of resin. The adhesive tape T follows the wires W and the wires W and the housing projection 28 are maintained in an integrally fixed state. Thus, the state where the wires W are fixed to the housing 20 can be maintained while avoiding a situation where the insulation coatings are damaged e.g. by a metal crimp member as with the conventional technology.

Further, the flanges 30 bite into the adhesive tape T wound around the housing projection 28. Thus, the fixing force of the adhesive tape T to the housing projection 28 can be enhanced and displacements of the adhesive tape T from the housing projection 28 in forward and backward directions FBD can be suppressed or significantly reduced. Thus, the state where the wires W are fixed to the housing 20 is maintained more reliably.

The invention is not limited to the above described embodiment. For example, the following embodiments also are included in the scope of the invention.

Two wires W are passed through the housing 20 in the above embodiment. However, the invention is not limited to such a mode and, for example, a housing may be configured so that one, three or four or more wires are passed therethrough.

The wire fixing member 10 is of a fluidproof waterproof type including the resilient plugs G and the seal ring 23 in the above embodiment. However, the invention is not limited to such a mode and, for example, may be applied to a non-fluidproof or non-waterproof wire fixing member.

Although a covering member is the adhesive tape T in the above embodiment, the invention is not limited to such a mode and, for example, the covering member may be a heat shrinking tube.

What is claimed is:

1. A wire fixing member to be fixed to a case housing of a device by fixing a shield shell to the case, comprising:
    a housing having opposite front and rear ends, the rear end configured to be at least partly held in the shield shell, first and second wire insertion holes extending through the housing from the front end to the rear end;
    first and second wires pulled out respectively through the first and second wire insertion holes of the housing in an extending direction;
    at least one housing projection located at a part of the housing where the wire is pulled out and formed with first and second oppositely facing guide grooves extending in the extending direction and aligned with the respective first and second wire insertion holes so that the first and second wires pulled out respectively from the first and second wire insertion holes are received in the respective first and second guide grooves, first and second covering member support surfaces extending between the guide grooves and aligned substantially parallel to the extending direction;
    first and second flanges projecting from the respective first and second covering member support surfaces at a leading end of the housing projection in a projecting direction transverse to the extending direction, the at least one flange having opposite first and second surfaces spaced apart in the extending direction; and
    a covering member having opposite inner and outer surfaces, the inner surface of the covering member adhering to the wire, the covering member support surfaces of the housing projection, and the opposite first and second surfaces of the flange to cover and integrally fix the wire and the housing projection.

2. The wire fixing member of claim 1, wherein the covering member comprises an adhesive tape that sticks to the wire and the housing projection.

3. The wire fixing member of claim 1, wherein a dimension of the housing projection in a projecting direction is larger than an outer diameter of the wire.

4. The wire fixing member of claim 3, wherein a width of the covering member is slightly larger than a projecting distance of the housing projection.

5. A wire fixing member of claim 1, wherein the covering member is wound around the housing projection and the wire in a width direction intersecting an extending direction of the wire and substantially covers from a base end of the housing projection to a position before a leading end of the housing projection.

6. The wire fixing member of claim 1, wherein the shield shell comprises at least one shield-connecting portion through which the wire can be passed, and wherein the shield-connecting portion is connected to the wire by a shield conductor and a connection member.

7. The wire fixing member of claim 6, wherein the housing comprises a resilient plug accommodating portion for accommodating a resilient plug fit to the wire to provide fluidproofness.

8. A wire fixing member, comprising:
 a housing having a fitting with opposite front and rear ends spaced apart in an extending direction, first and second substantially parallel wire insertion holes extending through the fitting from the rear end to the front end, a housing projection projecting forward from the front end of the fitting at a position between the wire insertion holes, the housing projection having first and second oppositely facing guide grooves aligned respectively with surfaces of the first and second wire insertion holes, first and second oppositely facing convex surfaces, each convex surface extending from the first guide groove to the second guide groove, first and second flanges projecting respectively from ends of the convex surfaces opposite the fitting and in projecting directions transverse to the extending direction;
 first and second wires extending through the respective first and second wire insertion holes and nested respectively in the first and second guide grooves and pulled out through the housing; and
 a covering member having opposite inner and outer surfaces, the inner surface of the covering member adhering to the wire and to the convex surfaces of the housing projection to cover and integrally fix the wire and the housing projection.

9. The wire fixing member of claim 8, wherein the covering member comprises an adhesive tape that sticks to the wire and the housing projection.

10. The wire fixing member of claim 8, further comprising a shield shell mounted over at least the rear end of the housing.

* * * * *